Oct. 28, 1947.    J. E. JOHANSSON    2,429,956
PISTON
Filed July 24, 1945    2 Sheets-Sheet 2

INVENTOR
JOHAN ERIK JOHANSSON

By Cushman, Darby & Cushman
ATTORNEYS

Patented Oct. 28, 1947

2,429,956

UNITED STATES PATENT OFFICE 2,429,956

PISTON

Johan Erik Johansson, Goteborg, Sweden, assignor to Aktiebolaget Gotaverken, Goteborg, Sweden, a corporation of Sweden Application July 24, 1945, Serial No. 606,819
In Sweden December 13, 1943

Section 1, Public Law 690, August 8, 1946.
Patent expires December 13, 1963

4 Claims. (Cl. 309—15)

1

The present invention relates to a piston for internal combustion engines, compressors and the like, comprising a piston skirt preferably consisting of light metal, and a piston head fastened to said skirt and provided with at least one axial projection which engages a corresponding recess in said skirt and which consists of a material having a smaller coefficient of expansion than the material of the skirt. As a result of the different coefficients of expansion, clearances of varying sizes will occur in such pistons between the skirt and the head. It is previously known to provide resilient members in connection with the bolts which connect the head to the skirt, in order to obtain an effective contact, even under varying operating conditions, between the portions of the skirt and head which abut against each other in a plane at right angles to the longitudinal axis of the piston. However, such contact surface is not sufficient enough to warrant an effective abstraction of heat from the piston head under high load conditions.

The invention has for its object to avoid the above-named inconvenience and to provide means for obtaining an effective heat transmitting connection between the parts of the piston.

Figure 1:
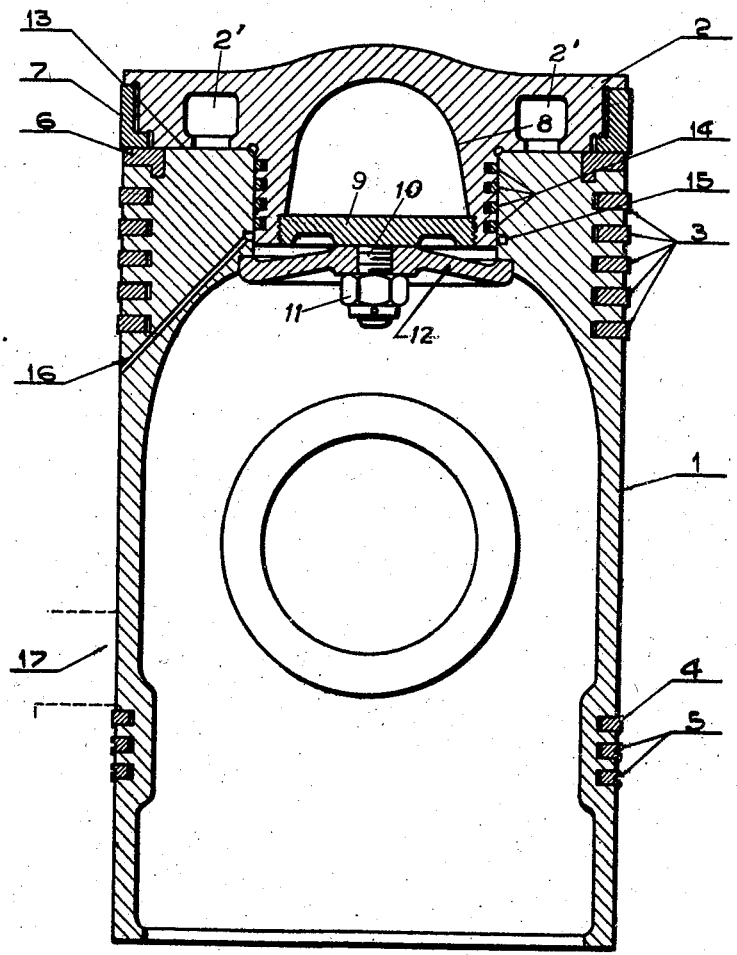
Figure 2:
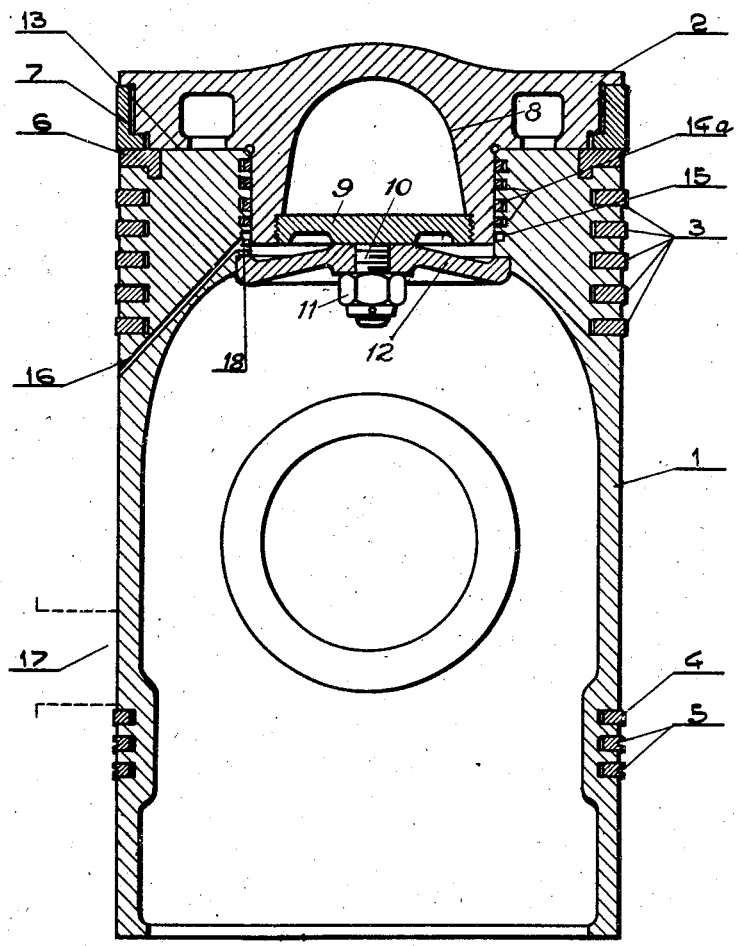

In the annexed drawing, there is illustrated a central section of a piston according to the invention, said piston being intended to be used in an internal combustion engine. Figs. 1 and 2 illustrate different embodiments of the invention.

The piston consists of a skirt 1 of light metal and a head 2 of steel. The skirt is in usual manner provided with packing ring 3 inserted in grooves near the upper end of the skirt, and further comprises a packing ring 4 and two oil stripping rings 5 at the lower end. In the upper end face of the skirt, there is provided a protecting ring 6 which abuts against a flame protecting ring 7 in the piston head. The head 2 may be provided with recesses or openings 2' for the purpose of reducing the weight of the head.

The head is provided with a guide member 8 in the shape of a central cylindrical projection which enters a corresponding recess in the skirt. The fastening means for the head comprises a disc 9 threaded into the projection 8 and connected with a bolt 10. The head is fastened to the skirt by means of a resilient ring 12 held in position by a nut 11. Due to this resilient ring connection, the contact surfaces 13 will be firmly pressed against each other even at varying temperature conditions.

The surfaces between the projection 8 and the corresponding recess in the skirt would increase

2 the total heat transmitting area between the head and the skirt, if said surfaces were in contact with each other. Since, however, said parts consist of materials having different coefficients of expansion, the parts will be in contact with each other only at the temperature at which they are put together. At the higher operating temperatures, a clearance will be present between the opposed surfaces of the projection and the recess, and said clearance will be increased as the temperature increases. As a result thereof, the transmission of heat from the head to the skirt will be reduced to a high extent. In order to eliminate this inconvenience, expansible heat conducting piston rings 14 are inserted into annular grooves in the projection 8. The said rings are outwardly expansible in radial direction and, consequently, provide for direct metallic contact between the projection and the recess by bridging the clearance therebetween irrespective of variations in temperature.

In order to remove combustion gases which possibly may enter the clearance between the head and the skirt, there is provided a groove 15 in the skirt near the lower end of the projection 8. By means of a drain passage 16, the groove 15 communicates with the clearance between the piston and the surrounding cylinder. Instead thereof, the drain passage may be connected to the space between the resilient ring 12 and the lower face of the projection 8, or drain passages may be connected both to the groove 15 and said space. Such a modification is shown in Fig. 2 in which an additional drain passage is indicated at 18. When the piston is in its inner dead centre position, the relative position of the exhaust ports is indicated by dotted lines at 17. The packing ring 4 prevents leakage of gas down into the crank case. The resilient ring 12 closes tightly the opening of the skirt and thus prevents gases from escaping from the groove 15 to the interior of the skirt and the crank case.

The expanding members may alternatively be devised as inwardly expansible piston rings inserted in grooves in the skirt. Such a modification is illustrated in Fig. 2, in which the resilient piston rings 14 are constructed such as to expand radially inwardly towards the projection 8.

What I claim is:

1. A piston comprising a piston skirt, a piston head fastened to said skirt, an axial projection on said head, a recess in said skirt, said recess being adapted to be engaged by said projection, said head and said projection consisting of a material having a smaller coefficient of expansion than the material of said skirt, and heat conducting expanding members adapted to bridge the clearance between the opposite faces of said projection and said recess.

2. A piston comprising a piston skirt, a piston head fastened to said skirt, an axial projection on said head, a recess in said skirt, said recess being adapted to be engaged by said projection, said head and said projection consisting of a material having a smaller coefficient of expansion than the material of said skirt, substantially annular grooves in said projection, and outwardly expansible heat conducting piston rings in said grooves.

3. A piston comprising a piston skirt, a piston head fastened to said skirt, an axial projection on said head, a recess in said skirt, said recess being adapted to be engaged by said projection, said head and said projection consisting of a material having a smaller coefficient of expansion than the material of said skirt, substantially annular grooves in said recess, and inwardly expansible heat conducting piston rings in said grooves.

4. A piston comprising a piston skirt, a piston head fastened to said skirt, an axial projection on said head, a recess in said skirt, said recess being adapted to be engaged by said projection, said head and said projection consisting of a material having a smaller coefficient of expansion than the material of said skirt, heat conducting expanding members adapted to bridge the clearance between the opposite faces of said projection and said recess, and a drain passage adapted to connect said clearance with the outer cylindrical face of said piston skirt.

JOHAN ERIK JOHANSSON.

REFERENCES CITED

The following references are of record in the file of this patent:

UNITED STATES PATENTS

| Number | Name | Date |
|---|---|---|
| 1,557,871 | Painter | Oct. 20, 1925 |
| 1,778,064 | Calkins | Oct. 14, 1930 |
| 2,069,594 | Schneider | Feb. 2, 1937 |